(12) United States Patent
Kim (10) Patent No.: US 10,661,749 B2
(45) Date of Patent: May 26, 2020

(54) ADJUSTABLE RESTRAINT SYSTEM

(71) Applicant: Hoon Y. Kim, Chicago, IL (US)

(72) Inventor: Hoon Y. Kim, Chicago, IL (US)

( * ) Notice: Subject to any disclaimer, the term of this patent is extended or adjusted under 35 U.S.C. 154(b) by 408 days.

(21) Appl. No.: 15/807,250

(22) Filed: Nov. 8, 2017

(65) Prior Publication Data
US 2019/0135225 A1    May 9, 2019

(51) Int. Cl.
*B60R 22/20* (2006.01)
*B60R 22/10* (2006.01)
*B60R 22/14* (2006.01)
*B60R 22/26* (2006.01)

(52) U.S. Cl.
CPC ............ *B60R 22/20* (2013.01); *B60R 22/105* (2013.01); *B60R 22/14* (2013.01); *B60R 22/26* (2013.01)

(58) Field of Classification Search
CPC ....... B60R 22/20; B60R 22/105; B60R 22/14; B60R 22/26
USPC .................................................... 280/801.2
See application file for complete search history.

(56) References Cited

U.S. PATENT DOCUMENTS

| | | | | |
|---|---|---|---|---|
| 4,236,755 A * | 12/1980 | Pollitt | ...................... | B60R 22/30 |
| | | | | 297/483 |
| 4,927,211 A * | 5/1990 | Bolcerek | .............. | A47D 15/006 |
| | | | | 297/465 |
| 5,301,371 A * | 4/1994 | Chao | .................. | A41D 13/0007 |
| | | | | 2/102 |
| 5,379,725 A * | 1/1995 | Roberson | ............. | A47D 13/086 |
| | | | | 119/770 |
| 5,468,020 A * | 11/1995 | Scime | .................. | B60N 2/2803 |
| | | | | 280/801.1 |
| 6,488,333 B2 * | 12/2002 | Kim | ...................... | B60N 2/0284 |
| | | | | 296/64 |
| 6,729,643 B1 * | 5/2004 | Bassick | .............. | A41D 13/0512 |
| | | | | 2/413 |
| 6,863,350 B1 * | 3/2005 | McCulley | ............ | B60N 2/2806 |
| | | | | 224/576 |
| 6,902,193 B2 | 6/2005 | Kim et al. | | |
| 7,401,859 B2 * | 7/2008 | Kim | ....................... | A44B 11/04 |
| | | | | 297/465 |
| 8,696,027 B2 * | 4/2014 | Diez Marin | ............ | B60R 22/14 |
| | | | | 280/801.1 |
| 9,067,561 B2 * | 6/2015 | Crews | .................... | B60R 22/105 |
| 2001/0013719 A1 * | 8/2001 | Carine | .................. | B60N 2/2806 |
| | | | | 297/484 |
| 2003/0001378 A1 * | 1/2003 | Kim | ...................... | A41D 13/018 |
| | | | | 280/801.1 |
| 2003/0047972 A1 * | 3/2003 | Burleigh | ............. | B60N 2/2878 |
| | | | | 297/216.11 |
| 2004/0169411 A1 * | 9/2004 | Murray | ................. | B60R 22/105 |
| | | | | 297/486 |
| 2007/0040441 A1 * | 2/2007 | Boyle | ................... | B60N 2/2806 |
| | | | | 297/467 |

(Continued)

*Primary Examiner* — Paul N Dickson
*Assistant Examiner* — Hilary L Johns
(74) *Attorney, Agent, or Firm* — Husch Blackwell LLP (57) ABSTRACT

The present invention relates to a restraint system for use in a vehicle with a seat belt system, including a plurality of straps that can be adjusted to conform to the changing dimensions in a wearer and to fit a variety of wearers. The restraint system includes multiple security members that facilitate attaching different kinds of seat belts to different locations on the restraint system. Thus, the restraint system can be used to secure its wearer to a variety of different seat belt systems in a variety of different vehicles.

17 Claims, 6 Drawing Sheets

(56) References Cited

U.S. PATENT DOCUMENTS

| | | | |
|---|---|---|---|
| 2007/0182235 A1* | 8/2007 | Fonseca De Arruda | ................... B60N 2/2812 297/468 |
| 2016/0114760 A1 | 4/2016 | Crawford | |
| 2016/0200288 A1* | 7/2016 | Kim | ........................ B60R 22/14 297/465 |
| 2017/0050611 A1* | 2/2017 | Farrugia | ............... B60R 22/105 |

* cited by examiner

ADJUSTABLE RESTRAINT SYSTEM

BACKGROUND

Motor vehicle crashes are a leading cause of death and injury in the United States. Despite several types of safety equipment currently used to prevent crash-related deaths and mitigate crash-related injuries, more than 35,000 people died in vehicle crashes on United States roads in 2015, with an additional 2.4 million people suffering traffic crash-related injuries during the same period.

The safety of automobile occupants generally relies upon the use of seat belts. Seat belts prevent the wearer from being thrown around the interior of a crashing vehicle. They also absorb some of the force that would be otherwise directed against the body of the seat belt wearer. However, seat belts are not always used by vehicle occupants. Many crash-related deaths and injuries are attributed to the failure to use seat belts, particularly among children.

But even if used faithfully, seat belts provide imperfect protection. For example, seat belts spread the force of impact over larger areas of the body, but can create accident-related injuries at the locations where they contact the body.

When the seat belt does not fit the wearer properly or is poorly adjusted, the effectiveness of the seat belt decreases. Children are particularly subject to risks posed by incorrectly fitted seat belts. Furthermore, seat belts found in standard automobiles are generally designed for adult-sized occupants. For children in particular, seat belts may not be adjustable to configurations best suited for smaller occupants.

Most states now require that children of a certain age or size be placed in child restraint systems to protect small children during motor crashes. However, there remains disagreement as to the most effective design for such restraint systems and surveys show that consumers frequently fail to use the child restraint systems properly, leading to a greater number of injuries to children in automobile crashes. A major problem that underlies failures of seat belts and child restraint systems relates to systems that fit their wearers poorly. Poorly-fitting child restraint systems may be ineffective in protecting children from crash-related injuries. There is a need for a restraint system that disperses force during a crash and can be adjusted to the configuration that provides maximum protection to each wearer while simultaneously allowing the wearer a degree of mobility to the upper body for the sake of comfort.

There is a need for a restraint system that can be adjusted to accommodate changes in the height or girth of a user, for example, due to growth, weight gain, or weight loss. It would be advantageous to be able to use the same restraint system for a child at all stages of development. There is also a need for a restraint system that can be adjusted to accommodate different amounts or layers of clothing. For example, it would be advantageous to be able to use the same restraint system for a child on during a winter vacation. The same restraint system could be used for the child wearing heavy, bulky cold-weather clothing as he leaves his winter home, and for the same child wearing lighter clothing in a warm-weather destination.

There is a particular need for restraint systems that can be easily adjusted by consumers for use with a variety of wearers. For example, in order to safely transport minor travelers, the operators of commercial vehicles, such as a plane, train, or taxi, may need restraint systems that can accommodate passengers of a variety of sizes. It may be particularly advantageous for a commercial vehicle operator to possess an adjustable restraint system that can be meet the vehicle safety restraint requirements for a child of nearly any age or size.

There is also a need for a restraint system that can be adjusted to secure the wearer to the seats of a variety of vehicles. Some vehicles, such as many modern automobiles, use a lap seat belt and a shoulder seat belt to secure passengers. Some vehicles, such as some older automobiles, use a lap seat belt and a tether line, where the tether line attaches to the shoulders of a restraint system and to the automobile. Yet other vehicles, such as many airplanes, have seats that use only lap seat belts. It would be particularly advantageous for the same restraint system to be usable with all three types of vehicles.

Further, it would be advantageous for a restraint system to include an additional structure for anchoring the back of the restraint, for example, a structure for fastening a supplemental belt or strap to the back portion of the restraint system and using the belt to secure the back portion of the restraint system to the seat, independently of the seat belt system of the vehicle. Such a structure could provide an extra way to secure the restraint system, making the restraint system more secure. Such a supplemental structure can be particularly advantageous in situations where another seat belt or other restraining structure suddenly malfunctions or fails to operate.

There is also a need for a restraint system that can be used with different seat belt systems in different commercial vehicles associated with mass transportation, such as buses, school buses, trains, and airplanes.

For restraint systems used with the seat belt systems in vehicles, one size does not fit all. There is a need for an adjustable restraint system that can accommodate the changing needs of individual wearers. There is also a different need for an adjustable restraint system that can be used for a variety of different individual wearers and in different vehicles with different seat belt systems.

SUMMARY OF THE INVENTION

The present invention generally relates to a restraint system made of a number of straps, meant to be donned by an individual before entering a vehicle, and secured to the vehicle seat in which the individual sits. The individual is typically secured to the vehicle seat by securing one or more of the vehicle's seat belts to the restraint system.

The same restraint system can be used on more than one individual. The restraint system can be adjusted for a variety of users; it can be loaned, sold, or handed down for use by other users, extending its useful lifetime beyond a single wearer. Also, such restraint systems can be kept by individuals or groups that routinely transport multiple children and need such restraint systems to accommodate a variety of unknown future travelers, such as a taxi cab, bus, or other transport system. Some individuals may desire such a restraint harness to accommodate visitors or customers who require a safety system while they travel.

An additional advantage of the adjustable features of the restraint system can include the ability to arrange an unused restraint system into a compact configuration for ease of storage and transport.

An object of the invention relates to a restraint system for use in a vehicle with a seat belt system includes a plurality of straps for attaching to the seat belt system of the vehicle that include: a) first and second shoulder straps joined to each other in a rear portion of the restraint system, each shoulder strap having a shoulder seat belt security member for attaching a shoulder seat belt of the vehicle to the shoulder strap, each shoulder seat belt security member being slidable along the shoulder strap; b) a waist strap joined to the first and second shoulder straps, the waist strap having first and second ends for attaching to each other, the attached ends securing the waist strap to a torso of an individual; and c) a lap cover comprising first and second lap straps connected to the first and second shoulder straps, respectively, each lap strap removably attachable to the other lap strap and each lap strap comprising a lap seat belt guide member having an opening, each lap seat belt guide member defining a channel for receiving a lap seat belt of the vehicle; where the straps are wearable by an individual such that when the individual is seated inside the vehicle and the restraint system can engage at least one seat belt of the vehicle, the individual can be secured to a seat of the vehicle and the individual remains secured against the seat of the vehicle notwithstanding the motion of the vehicle.

Some embodiments can include a fastener for securing the waist strap to the individual, the fastener comprising a female lock portion attached to the first end of the waist strap, the female lock portion comprising a first fastening loop, a second fastening loop, and a clip for aligning the first fastening loop and the second fastening loop, wherein the aligned fastening loops define an opening for receiving a male lock portion.

Some embodiments can include a back security member, the back security member joining the shoulder straps and comprising a passageway for receiving a band for securing the back security member to the seat.

Some embodiments can include each shoulder seat belt security member comprising: a) a front cover connected to a back cover; b) a positioning strap extending diagonally between opposite corners of the back cover; and c) a shoulder seat belt guide member having an opening and defining a channel for receiving a shoulder seat belt of the vehicle, the shoulder seat belt guide member slidingly engaging the positioning strap; where the front cover can open for engaging the shoulder seat belt with the channel of the shoulder seat belt guide member, the front cover can close to secure the shoulder seat belt within the shoulder seat belt security member, and the shoulder strap is positioned between the back cover and the positioning strap. Some embodiments can further include the shoulder seat belt guide member having a variable position for adjusting the shoulder seat belt security member to align with the shoulder seat belt.

Some embodiments can include each shoulder strap having a tether security member for attaching a tether line to the shoulder strap. Some embodiments can further include the shoulder strap comprising a passageway for threading the tether line through the shoulder strap.

Some embodiments can include the first and second ends of the waist strap being connected to the first and second shoulder straps, respectively.

Another object of the invention relates to a restraint system for use in a vehicle with a seat belt system comprising: 1) first and second shoulder straps, each shoulder strap having: a) a front portion, b) a back portion, and c) a shoulder seat belt security member attached for sliding movement along the front portion of the shoulder strap; 2) a back security member attaching the back portions of the shoulder straps to each other; 3) a waist strap joined to the front and back portions of the shoulder straps, the waist strap including a first front section for attaching to a second front section, the front sections for securing the waist strap to a torso of an individual; and 4) a plurality of lap straps attached to a front portion of the waist strap by a plurality of connection straps joining the lap straps to the waist strap, each lap strap comprising a lap seat belt guide member having: i) an opening for inserting a lap seat belt of the vehicle and ii) a channel for receiving the lap seat belt, and neighboring lap straps overlapping and fastening to each other; where the straps are wearable by an individual such that when the individual is seated in the vehicle, the restraint system can secure at least one seat belt of the vehicle and secure the individual against a seat of the vehicle notwithstanding the motion of the vehicle.

Some embodiments can include each shoulder seat belt security member comprising: front and back covers; a positioning strap extending diagonally between and attaching to opposite corners of the back cover, the shoulder strap positioned between the positioning strap and the back cover; and a shoulder seat belt guide member having an opening and defining a channel for receiving a shoulder seat belt of the vehicle, the shoulder seat belt guide member slidingly engaging the positioning strap; where the front cover can open for engaging the shoulder seat belt with the shoulder seat belt guide member, and the front cover can close to secure the shoulder seat belt within the shoulder seat belt security member; and where the restraint system is wearable by an individual such that when the individual is seated in the vehicle, the restraint system can secure the lap seat belt and a shoulder seat belt of the vehicle and secure the individual against the seat of the vehicle notwithstanding the motion of the vehicle. Some embodiments can further include the shoulder seat belt guide member having a variable position for aligning the shoulder seat belt within the channel of the shoulder seat belt guide member.

Some embodiments can include the back security member comprising a passageway for receiving a band for securing the back security member to a back portion of the seat; where the restraint system is wearable by an individual such that when the individual is seated in the vehicle, the restraint system can secure the lap seat belt of the vehicle, secure the band to the seat, and secure the individual against the seat of the vehicle notwithstanding the motion of the vehicle. Some embodiments can further include the back security member joining the shoulder straps along a first line defined by the points where the outer edges of the shoulder straps cross each other, and the back security member joining the shoulder straps along a second line defined by the points where the inner edges of the shoulder straps cross each other.

Some embodiments can include each shoulder strap comprising a tether security member for attaching a tether line to the shoulder strap; where the restraint system is wearable by an individual such that when the individual is seated in the vehicle, the restraint system can secure the lap seat belt of the vehicle, secure the tether line to the seat, and secure the individual against the seat of the vehicle notwithstanding the motion of the vehicle.

Some embodiments can include the back security member joining the shoulder straps that cross over each other.

Another object of the invention relates to a restraint system for use with seat having a seat belt system comprising: a) first and second shoulder straps, each shoulder strap having a front portion, a back portion, and a shoulder seat belt security member attached for sliding movement of the shoulder seat belt security member along the front portion of the shoulder strap, the back portions of the shoulder straps crossing over each other, the shoulder seat belt security member for securing a shoulder seat belt to the restraint system; b) a back security member attaching the back portions of the shoulder straps to each other, the back security member comprising a passageway, the back security member for securing a supplemental belt to the restraint system; c) each shoulder strap having a tether security member located between the front and back portions, the tether security member for securing a tether line to the restraint system; d) a waist strap joined to the front and back portions of the shoulder straps, a first front section of the waist strap for attaching to a second front section of the waist strap, the waist strap for securing the restraint system to an individual; and e) a lap cover comprising first and second lap straps connected to the first and second front sections of the waist strap, respectively, each lap strap removably attachable to the other lap strap and each lap strap comprising a lap seat belt guide member having an opening, each lap seat belt guide member defining a channel for receiving a lap seat belt, the lap cover for securing a lap seat belt to the restraint system; where the straps are wearable by the individual such that when the individual is seated in the seat, the restraint system can secure at least one seat belt of the seat and secure the individual against the seat.

Some embodiments can include a fastener for securing the waist strap to the individual, the fastener comprising a female lock portion attached to a first end of the waist strap, the female lock portion comprising a first fastening loop, a second fastening loop, and a clip for aligning the first fastening loop and the second fastening loop, wherein the aligned fastening loops define an opening for receiving a male lock portion.

Some embodiments can include each shoulder seat belt security member comprising: a front cover and a back cover connected to each other; a positioning strap extending diagonally between and attaching to opposite corners of the back cover, the shoulder strap positioned between the positioning strap and the back cover; and a shoulder seat belt guide member having an opening and defining a channel for receiving a shoulder seat belt of the vehicle, the shoulder seat belt guide member slidingly engaging the positioning strap; where the front cover can open to expose the positioning strap and the shoulder seat belt guide member, the front cover can close to conceal the positioning strap and the shoulder seat belt guide member, and the shoulder strap is threaded between the back cover and the positioning strap. Some embodiments can further include the shoulder seat belt guide member having a variable position for adjusting the shoulder seat belt security member to align with the shoulder seat belt. Some embodiments can further include the back portion of each shoulder strap comprises a passageway for threading a tether line through the shoulder strap.

A more detailed explanation of the invention is provided in the following description and claims and is illustrated in the accompanying drawings.

DETAILED DESCRIPTION OF THE INVENTION

The present invention relates to a restraint system for use in an automobile or vehicle for attachment to the seat belt of an automobile or other vehicle. The restraint system can include a plurality of straps and fasteners that can be worn over garments.

The restraint system or harness can be worn by an occupant in the vehicle such that when the occupant wears the restraint system, the occupant is secured to the seat-belt of the vehicle so that the rider remains secured against the seat of the vehicle, in the event of a crash or other abrupt, unexpected motion of the vehicle. In particular, the restraint system can be adjusted by a consumer to conform to the bodies of different individual wearers and to conform to vehicles of different dimensions and having different seat belt configurations.

The restraint system straps can be made of the same materials as seat belt straps and can include energy absorbing pads and materials which, along with the restraint provided by the harness, provide security and energy absorption during an automobile crash or other violent movement of a vehicle with occupants. The materials used can be light-weight and durable and are inexpensive to make and produce in desirable shapes and sizes.

Referring now to FIGS. 1-7, embodiments of the restraint system 10 of the present invention are shown. The restraint system 10 can comprise a number of straps 22 and can have a fastener 24, such as a buckle, attached to the straps 22. The restraint system 10 can be attached to the seat 1003 of a vehicle seat by securing one or more of the vehicle's seat belts to the restraint system 10.

Generally, the restraint system includes shoulder straps 26 that are arranged over the shoulders when worn, a waist strap 56 that is secured around the waist or torso of a wearer 1001, and a lap cover 74 that is arranged in front of the wearer's lap.

In the present embodiment, as shown in FIGS. 1A-1B, 2, and 3B-3C, a first shoulder strap 26a and a second shoulder strap 26b are placed in a vertical orientation relative to the position of a standing or seated individual 1001 wearing the restraint system 10. The shoulder straps 26a, 26b are of a sufficient length such that they can reach from the front waist height of a wearer 1001 to the rear waist height of the wearer 1001, passing over the wearer's shoulders, in a manner similar to that of a pair of suspenders. The length of the shoulder straps 26 can be adjusted to accommodate users 1001 of different heights and/or girths.

Securing the Restraint System to the Wearer

As shown in FIGS. 1-2 and 5-7, a waist strap 56 can be placed in a horizontal orientation relative to shoulder straps 26a, 26b, relative to a wearer 1001 in a seated position. As will be understood by persons having skill in the art, the waist strap 56 can be attachable to shoulder straps 26a, 26b in manners well known in the art, such as by stitching, rivets, adhesives, combinations of these or other manners know to persons having skill in the art. The waist strap 56 can comprise padding 44 joined to the inner and/or outer surface 70, 68 of the waist strap 56. Such padding 44 can protect the wearer 1001 from accidental injury by the waist strap 56 or by a fastener 24 of the waist strap 56 during violent vehicle movement by providing some physical protection of the wearer's midsection or by dispersing some of the force applied by the waist strap 56 during a collision or other violent movement. Similarly, the other straps (i.e., shoulder straps 26, waist strap 56, lap straps 76, 78) can similarly comprise padding 44 on their inner and/or outer surfaces.

It will be understood that the waist strap 56 can be connected to itself in manners well known in the art. In some embodiments, the outer surface 68 of the waist strap 56 can attach to the inner surface 70 of the waist strap 56, the inner surface 70 near a first end 92 of the waist strap 56 attaching to the outer surface 68 near a second end 94 of the waist strap 56. Such waist strap ends 92, 94 can be removably attachable to each other by means of any manner of cloth fastening, including but not limited to hook and eye fasteners such as Velcro® fasteners.

Figure 1A:
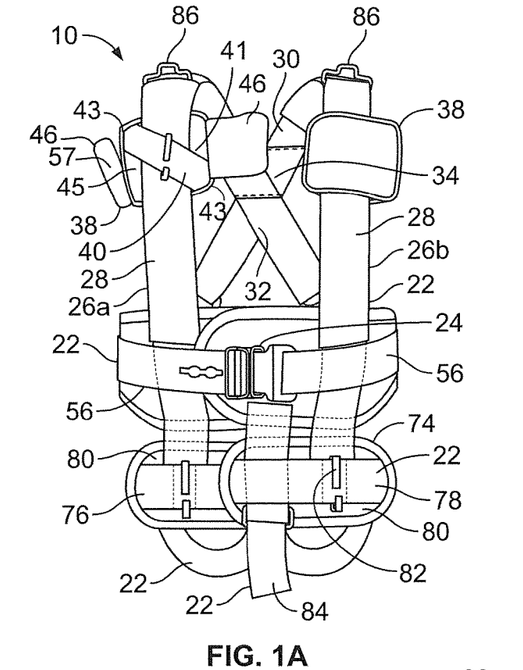
FIGS. 1A-1B show a front view of an embodiment of a restraint system with a first shoulder seat belt security member in an open conformation and a second shoulder seat belt security member in a closed conformation.
Figure 1B:
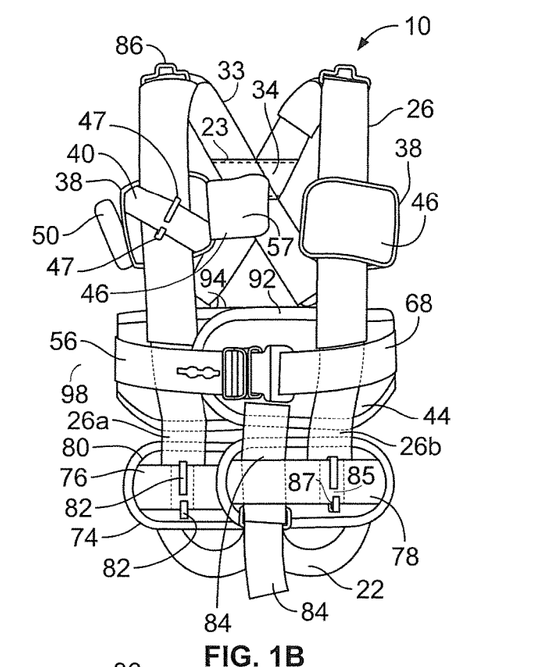
Figure 2:
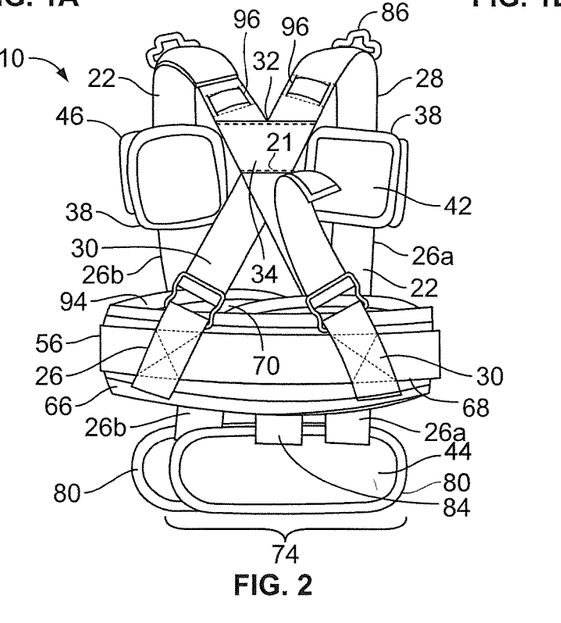
FIG. 2 shows a back view of a restraint system.

In preferred embodiments, as shown in FIGS. 1A-1B and 2, a first front section 92 of the waist strap 56 can attach to second front section 94 of the waist strap 56 to secure the restraint system 10 around the waist or torso of a wearer 1001.

Securing the Seat Belt System to the Restraint System Via the Wearer's Back

In preferred embodiments, the front portions 28 of the shoulder straps 26a, 26b are generally parallel to each other, and the rear portions 30 of the shoulder straps 26a, 26b can cross over each other such that the rear portions 30 form an "X" shape or intersection portion 32. It will be understood by persons having skill in the art that a different configuration of the shoulder straps 26a, 26b, such as a "Y" configuration, can be made.

At the intersection portion 32, the shoulder straps 26 can be joined together; for example, the shoulder straps 26 can be sewn for glued together. Alternately, the shoulder straps can be manufactured as a unitary piece including the intersection portion 32.

As particularly shown in FIGS. 1A-1B, 2B-2C, and 3B-3C, the intersection portion 32 can include a back security member 34. The back security member 34 can be joined or attached to the intersection portion 32, on either the inner or outer surface of the restraint system. As particularly shown in FIG. 3C, the back security member 34 can cover portions of the shoulder straps 26 in the area where they cross over each other. The back security member 34 can include a portion of a strap 22 or a sturdy piece of material that is affixed to the crossed-over shoulder straps 26.

A first edge 21 or side of the back security member 34 can span the shoulder straps 26 along a first line defined by the points where the outer edges 31 of the shoulder straps cross or intersect each other. A second edge 23 or side of the back security member 34 can span the shoulder straps 26 along a second line defined by the points where the inner edges 33 of the shoulder straps 26 cross each other. In some embodiments, the first edge 21 can be located closer to the waist strap 56 than the second edge 23 when the restraint system 10 is worn by an individual 1001; in other embodiments, the first edge 21 can be located further from the waist strap 56 than the second edge 23.

In some embodiments, that first and second edges 21, 23 can traverse the shortest distance between the intersecting outer or inner edges 31, 33 of the shoulder straps 26.

Figure 3A:
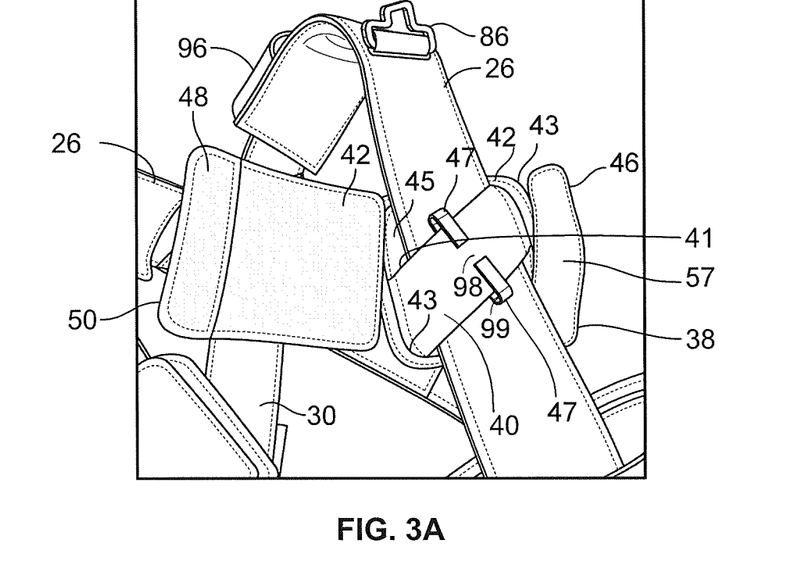
FIG. 3A shows a view of a shoulder seat belt security member with cover in an open conformation.
Figure 3B:
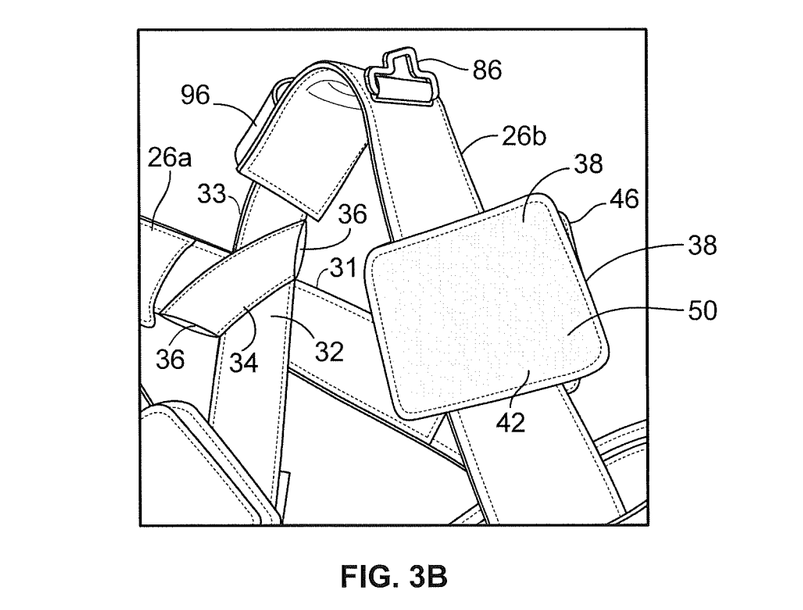
FIG. 3B shows a view of a shoulder seat belt security member with cover in an closed conformation.
Figure 3C:
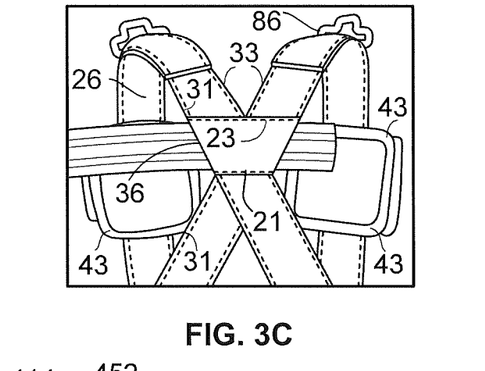
FIG. 3C shows a close up view of the shoulder seat belt security member.

The back security member 34 can define a passageway 36 substantially parallel to the waist strap 56 when the restraint system 10 is worn by an individual 1001. The passageway 36 can be wide enough that another strap or a supplemental band 1021 can be threaded through the passageway 36, preferably in a straight path. The first and second edges 21, 23 of the back security member 34 can be joined to the shoulder straps 26 to define the passageway 36. The passageway 36 can have one side defined by the back security member 34 and another side defined by the intersecting shoulder straps 26; alternatively, the back security member 34 can include a passageway 36 that is separate from the shoulder straps 26. In some embodiments, such as shown in FIG. 3C, the back security member 34 can have a trapezoidal shape, with the first and second edges defining the bases of the trapezoid.

Figure 7:
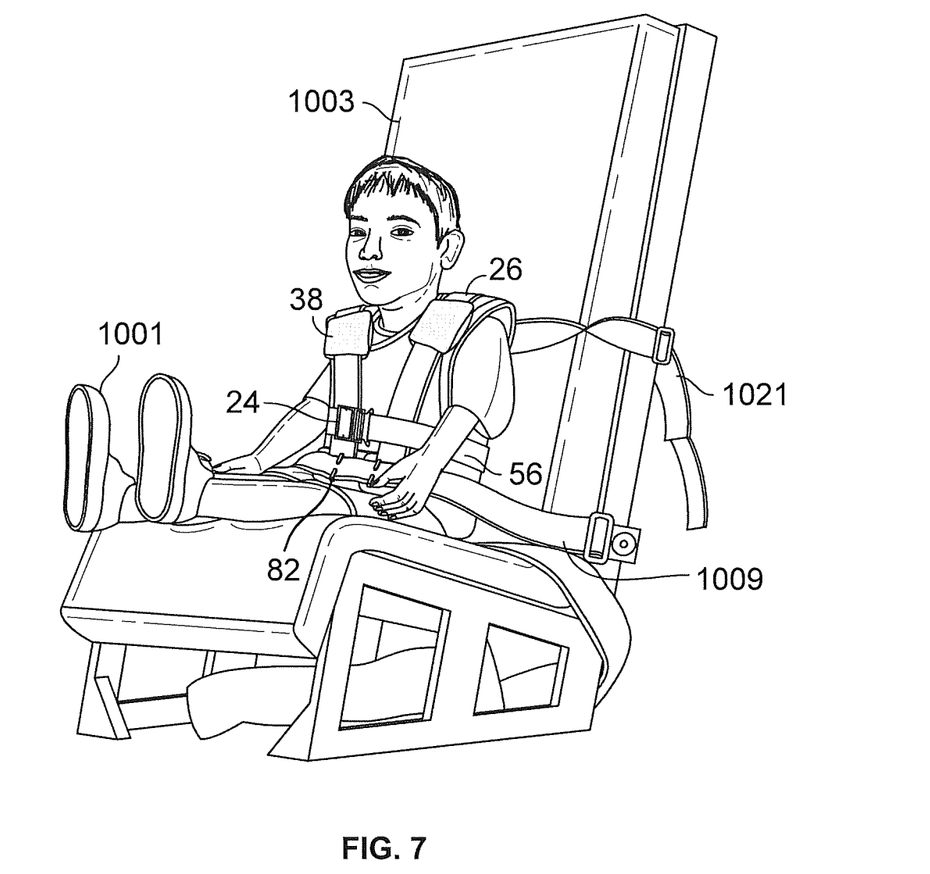
FIG. 7 shows another alternate embodiment of the restraint system using a lap seat belt and a band to secure an individual.

As shown in FIG. 7, a band 1021 or supplemental strap can be used to secure the back security member 34 of the restraint system 10 to the seat 1003 of the vehicle. The band 1021 can be threaded through the passageway 36 of the back security member 34 and when the individual 1001 is sitting in the seat 1003, the band 1021 can be fastened behind (or around or to) the individual's seat. It is envisioned that the fastened band 1021 will be fastened tight enough to safely secure the individual 1001 to the seat 1003, securing the restraint system 10 to a location on or near the wearer's back. Because the band 1021 can slide through the passageway 36, the individual 1001 can be provided some freedom of movement.

It will be seen that the attached combination of shoulder straps 26a, 26b are of sufficient lengths to exceed the distance defined by the exterior of the wearer's torso. It will be understood by persons having skill in the art that means to expand and contract the length of each of the shoulder straps 26a, 26b can be provided, in a manner well known in the art, such that the plurality of straps 22 is adjustable to the height of the same of different wearers 1001, while maintaining the "X" or "Y" or other configuration found in the intersection portion 32 in the rear portions 30 of the shoulder straps 26.

Securing the Seat Belt System to the Restraint System Via the Wearer's Torso

As shown in FIGS. 3A-3B, 6, and 7, each shoulder strap 26 can include a shoulder seat belt security member 38 for guiding a shoulder seat belt 1007 of a vehicle to align along a shoulder strap 26 and for securing the shoulder seat belt 1007 of the vehicle to the shoulder strap 26 at the location where the shoulder seat belt 1007 crosses over the shoulder strap 26 of the restraint system 10, when an individual 1001 wearing the restraint system 10 is seated in the seat 1003 of a vehicle having a shoulder seat belt 1007. The shoulder seat belt security member 38 can include front and back covers 46, 42 that are attached to each other. The covers 46, 42 can be made of a single piece or multiple pieces. In an opened configuration, the front cover 46 can open or disengage from the back cover 42 to expose the interior surface of the back cover. In a closed configuration, the front cover 46 can engage the back cover 42 to cover or conceal the interior surface 45 of the back cover 42.

The back cover can include a positioning strap 40 attached to opposite corners 43 of the interior surface of the back cover. The positioning strap 40 can extend in a diagonal line between the opposite corners. The interior surface 45 of the back cover 42 and the positioning strap 40 can form a slot 41 through which the shoulder strap 26 can be threaded.

The positioning strap 40 can define a straight line crosses the shoulder strap 26 at an angle that is neither a right angle nor a straight line.

It is preferred that the positioning strap 40 is snug enough to keep the seat belt in contact with the interior surface 45 of the back cover 42, yet loose enough that the shoulder strap 26 can slide through the slot 41. The shoulder seat belt security member 38 can thus slide along the front portion 28 of the shoulder strap 26, between the waist strap 56 and the tether security member 86. Alternatively, the front portion 28 of the shoulder strap 26 can be said to slidingly engage the shoulder seat belt security member 38.

In an individual 1001 wearing the restrain system, this movement allows the vertical adjustment of the shoulder seat belt security member 38 along the front portion 28 of the shoulder strap 26.

The shoulder seat belt security member 38 can include a shoulder seat belt guide member 47 for guiding the shoulder seat belt 1007 of the vehicle into alignment with the shoulder seat belt security member 38. The shoulder seat belt guide member 47 can include a "C"-shaped structure encircling the positioning strap 40 with an opening 98 facing the interior surface 57 of the front cover 46 (or facing away from the shoulder strap 26). The positioning strap 40 can slidingly pass through the channel 99 defined by the "C"-shaped shoulder seat belt guide member 47.

It is preferred that the length of the shoulder seat belt guide member 47 be longer than the width of the positioning strap 40. The length of the shoulder seat belt guide member 47 can be long enough so that the shoulder seat belt guide member 47 can freely slide along positioning strap 40 and rotate around the positioning strap 40 to some degree, but it is preferred that the shoulder seat belt guide member 47 be concealed from view when the front cover 46 is in the closed configuration. The shoulder seat belt guide member 47 can have a variable position for adjusting its orientation and location on the positioning strap 40.

It is preferred that the opening 98 of the shoulder seat belt guide member 47 be long enough so that standard vehicle shoulder seat belts 1007 can be threaded through the opening 98 and manipulated to align against the positioning strap 40, which can be aligned against the channel 99. Preferably, the positioning strap 40 and the shoulder seat belt guide member 47 are wide enough so that the vehicle shoulder belt can lie flat against the positioning strap 40 after the shoulder belt is threaded through the opening 98 of the shoulder seat belt guide member 47. It is preferred that the opening of the shoulder seat belt guide member 47 be narrow enough so that the shoulder seat belt guide member 47 remains positioned around the positioning strap 40.

It is envisioned that the restraint system 10 can secure a shoulder seat belt 1007 by opening the front cover 46 of the shoulder seat belt security member 38 to expose the positioning strap 40 to view. When the shoulder strap 26 is engaged around the seated wearer 1001 of the restraint system 10, the position of the shoulder seat belt security member 38 can be adjusted to align with the shoulder seat belt where it crosses the body of the wearer 1001.

The shoulder seat belt security member 38 can slide along the front portion 28 of the shoulder strap 26 (in a vertical direction with respect to the seated wearer 1001) so that the shoulder seat belt security member 38 contacts the shoulder seat belt 1007. The shoulder seat belt 1007 can be threaded through the opening 98 of the shoulder seat belt guide member 47 to rest against the positioning strap 40. The shoulder seat belt guide member 47 can be manipulated or moved along the positioning strap 40 to fully engage the shoulder seat belt 1007, to bring the shoulder seat belt 1007 in alignment along the positioning strap 40, which is aligned along the channel 99. When at rest, the shoulder seat belt 1007 preferably rests flat or is aligned in a contiguous fashion against the positioning strap 40. After the shoulder seat belt 1007 has been guided into position within the shoulder seat belt guide member 47, the front cover can be closed, thus securing the shoulder seat belt 1007 within the shoulder seat belt security member 38, between the front and back covers 46, 42.

Either or both covers 42, 46 can include padding 44. In preferred embodiments, the front cover 46 can include a securing means making the shoulder seat belt security member 38 removably attachable to itself (i.e., a first portion of the front cover can be removably fastened to a second portion of the front cover by means of any manner of cloth fastening, including but not limited to hook and eye fasteners such as Velcro® fasteners).

Figure 5:
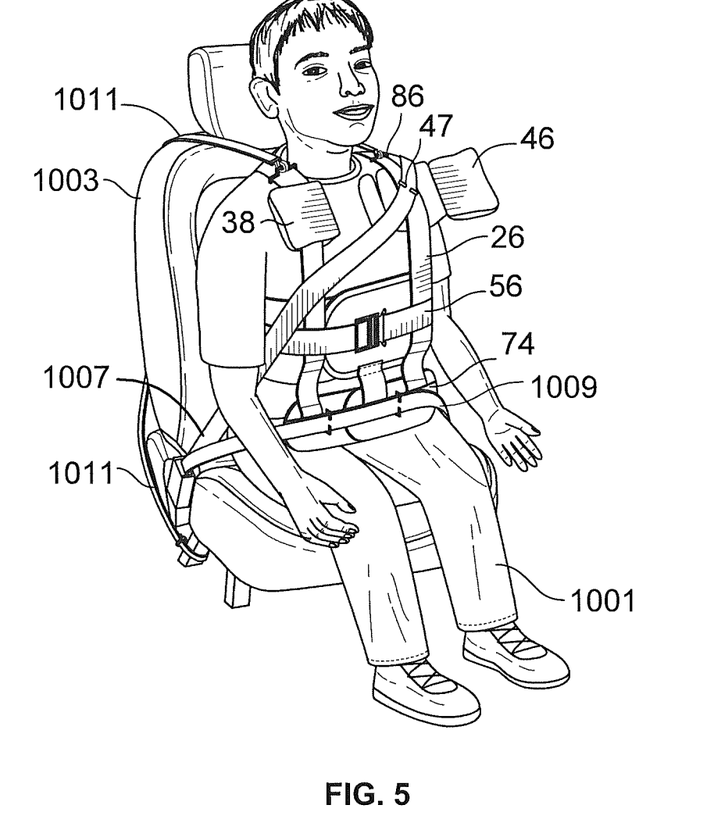
FIG. 5 shows an embodiment of the restraint system using a lap seat belt, a shoulder seat belt, and a tether line to secure an individual.

Securing the Seat Belt System to the Restraint System Via the Wearer's Shoulder Tops As shown in FIG. 5, the restraint system 10 can include a means for securing a wearer 1001 to a vehicle via a tether line 1011 that connects the wearer 1001 to the seat 1003. The shoulder straps 26 can include tether security members 86 for engaging the tether lines 1011 and attaching the tether lines 1011 to the restraint system 10. The tether security members 86 can be located between the front and rear portions 28, 30 of the shoulder straps 26. On a seated individual 1001 wearing a restraint system 10, the tether security members 86 can be located near the tops or apexes of the individual's shoulders. The tether security members 86 can provide a means for anchoring the restraint system 10 near the top of the wearer 1001 to an anchoring structure at the top of a car seat (i.e., a tether anchor). Alternatively, the tether security members 86 can provide a means for anchoring the restraint system 10 near the top of the wearer 1001 to a tether line 1011 anchored behind or beneath the seat, as shown in FIG. 5.

The tether security member 86 can be removably joined to the anchoring structure, preferably while the lap seat belt 1009 is engaged by the lap straps 76, 78 as described below. It will be understood by persons having skill in the art that the tether security member 86 can comprise any type of attachment device, including rings, carabineers, D-ring connectors, or other loop type fasteners, without departing from the novel scope of the present invention.

Each shoulder straps 26 can include a tether channel 96 in the rear portion 30 of the shoulder strap 26. When the tether line 1011 is engaged with the restraint system 10, the tether line 1011 can be threaded through the tether channel 96, to align the tether line 1011 along the rear portion 30 of the shoulder strap 26. Thus, the tether line 1011 can be guided or secured between the tether security members 86 and corresponding anchoring structure(s). This feature can reinforce the tether line 1011 and enhance the restraining and safety features of the tether line 1011. This feature can minimize the risk of the tether line 1011 snagging on another structure or being inadvertently or purposely disengaged.

The tether channels 96 can be formed by placing slits in the shoulder straps 26; alternatively, the tether channels 96 can be formed by the addition of supplemental straps connected or joined to the shoulder straps 26. In some embodiments, a plurality of tether channels 96 can be introduced to each shoulder strap 26.

Securing the Seat Belt System to the Restraint System Via the Wearer's Lap

It will be seen that the restraint system 10 shown in FIGS. 1-2 can be constructed to include a lap cover 74 extending from the front portions 28 of the shoulder straps 26a, 26b of the restraint system 10. The lap cover 74 can secure a vehicle lap seat belt 1009 to the restraint system 10 of the restraint system 10. The lap cover 74 can position the lap seat belt 1009 so that in cases of impact or violent movement, the waist and the soft organs of the midsection of the wearer 1001 are protected against force applied by the attached lap belt.

As shown in FIG. 1, The lap cover 74 can include at least an inner lap strap 76 and an outer lap strap 78, the inner lap strap 76 joined to the first shoulder strap 26a and the outer lap strap 78 joined to the second shoulder strap 26b. The lap straps 76, 78 can comprise a means for guiding 82 a lap seat belt 1009 to the lap straps 76, 78, such as a tab or loop. The lap cover 74 can comprise additional lap straps.

The lap straps 76, 78 can be joined or connected to the waist strap 56. The lap straps 76, 78 can be joined to the waist strap padding 44. In some embodiments, a single lap strap is envisioned, while in other embodiments additional lap straps can be included in the lap cover 74. In some embodiments, neighboring lap straps can overlap each other and fasten to each other; in further embodiments, the fastened straps can provide a lap cover 74 with a continuous or sold front surface.

The lap straps can each include one or more lap seat belt guide members 83 secured to the lap straps 76, 78. Each lap seat belt guide member 83 can include an opening 85 for into which a lap seat belt 1009 of the vehicle is inserted or threaded, as well as a channel 87 for receiving the lap seat belt 1009. It is envisioned that when an individual 1001 wearing the restraint system 10 is seated in a vehicle having a lap seat belt 1009, the lap seat belt 1009 can be threaded through the opening 85 of the lap seat belt guide member 83 to align along (and preferably lie flat against) the channel 87 and thus against the lap cover 74.

Figure 6:
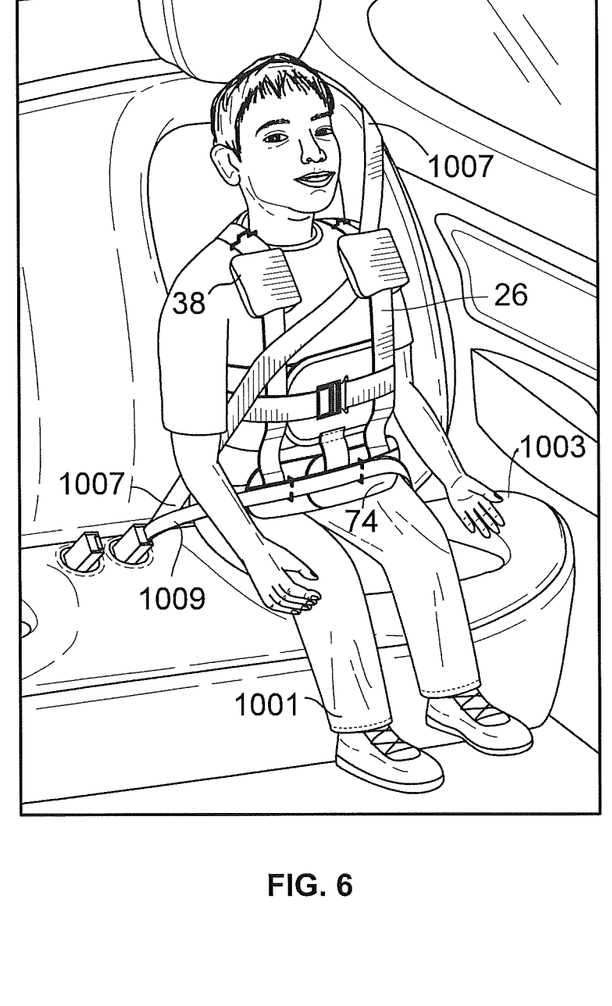
FIG. 6 shows an alternate embodiment of the restraint system using a lap seat belt and a shoulder seat belt to secure an individual.

Preferably, the lap seat belt guide member 83 is wide enough so that the vehicle lap belt can lie flat against the lap cover 74 after the lap seat belt 1009 engages the lap seat belt guide member 83. It is preferred that the opening of the lap seat belt guide member 83 be small enough so that the lap seat belt guide member 83 remains secured to the lap strap 76, 78. In some embodiments, the lap straps 76, 78 can include stitching to secure the lap seat belt guide member 83 in place. However, it is preferred that the channel 87 have a width greater than the width of the lap straps 76,78 so that the lap seat belt guide members can be positioned within the lap straps 76, 78 and/or slidingly move along the lap straps 76, 78, to bring the lap seat belt 1009 in alignment with the lap cover 74, as shown in FIGS. 5-7.

In some embodiments, the lap cover 74 can comprise supplemental connection straps 84, to attach or join a lap strap 76, 78 to a shoulder strap 26a, 26b and reinforce the connection between the straps 22 in the restraint system 10. Such supplemental connection straps 84 can include a means for attaching the supplemental connection straps 84 to other restraint systems, and can comprise any type of fasteners, buckles, loop, or any type of attachment device, including rings, carabineers, D-ring connectors, or other loop type fasteners, without departing from the novel scope of the present invention.

The Fastening Mechanism

The waist strap 56 can comprise a fastener 24 for securing the waist strap 56 to the wearer 1001 of the restraint system 10. In preferred embodiments, the fastener 24 is constructed to prevent the wearer 1001 from removing the restraint system 10. In particularly preferred embodiments, the fastener 24 resists tampering by children.

Figure 4A:
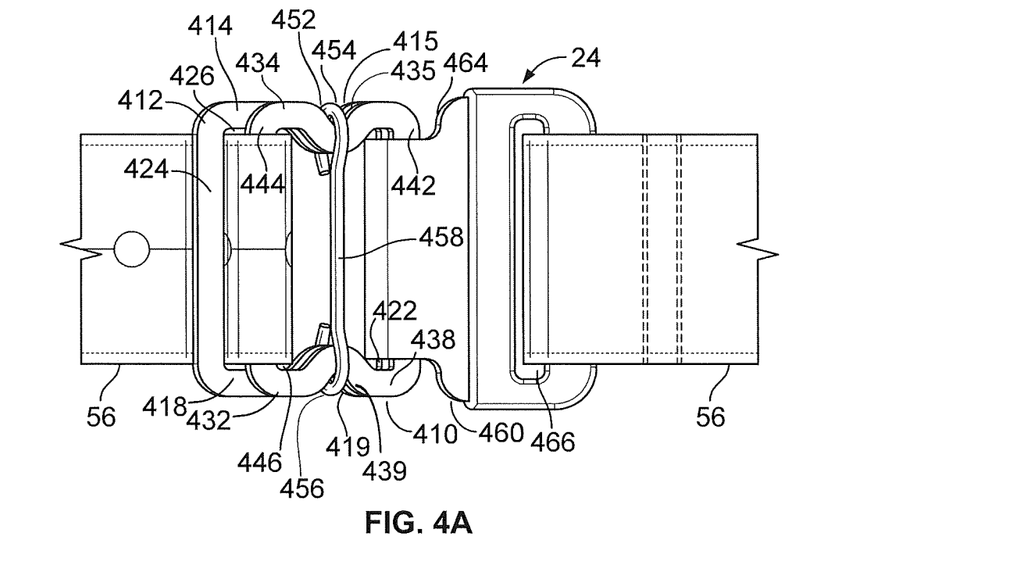
FIG. 4A shows a front view of a fastener and FIG. 4B shows a top plan view of the fastener.
Figure 4B:
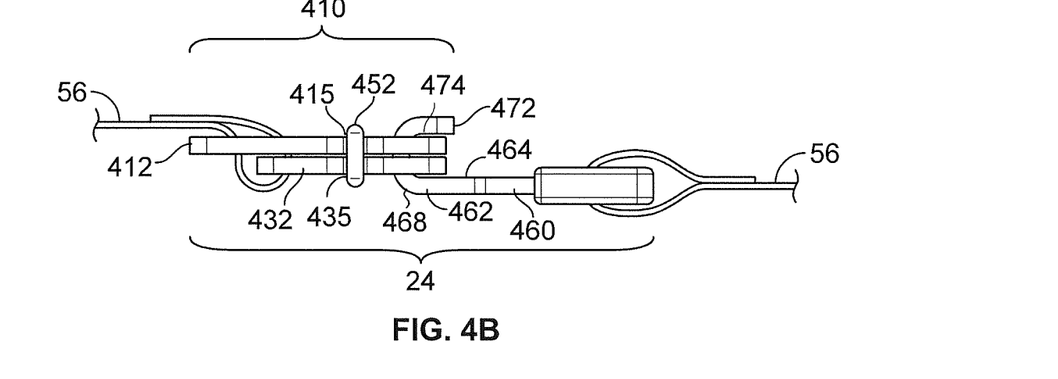

As shown in FIGS. 1A and 4A-4B, the fastener 24 of the waist strap 56 can include a female lock portion 410 (i.e., loop) on a first end 92 of the waist strap 56 and a male lock portion 460 (i.e., hook) on a second end 94 of the waist strap 56, with the ends 94, 92 of the waist strap 56 for attaching one another 410, 460 together. In some embodiments, the female lock portion 410 can comprise a first fastening loop 412, a second fastening loop 432, and connection member 452 for aligning the first fastening loop 412 and the second fastening loop 432 together, wherein each fastening loop 412, 432 includes an opening 426, 446 for receiving the male lock portion 460.

In some embodiments, as shown in FIGS. 1A-1B and 2, a first front section 92 of the waist strap 56 can attach to second front section 94 of the waist strap 56 to secure the restraint system 10 around the waist or torso of a wearer 1001. The waist strap 56 can comprise a fastener 24 for securing the waist strap 56 to the wearer 1001 of the restraint system 10. In preferred embodiments, the fastener 24 is constructed to prevent the wearer 1001 from removing the restraint system 10. In particularly preferred embodiments, the fastener 24 resists tampering by children.

Generally, the fastener 24 of the waist strap 56 can include a female lock portion 60 (i.e., loop) on a first end 92 of the waist strap 56 and a male lock portion 61 (i.e., hook) on a second end 94 of the waist strap 56, with the ends 94, 92 of the waist strap 56 joining one another. In some embodiments, the female lock portion 60 can comprise a first fastening loop 62, a second fastening loop 64, and clip 65 for aligning the first fastening loop 62 and the second fastening loop 64, wherein the aligned fastening loops 62, 64 define an opening 69 for receiving the male lock portion 61. Each fastening loop 62, 64 can comprise a top indentation 71 and a bottom indentation 72 for aligning the clip 65 that fastens them together. The fastening mechanism 24 is described in greater detail below.

As shown in FIGS. 1A and 4A-4B, the fastener 24 of the waist strap 56 can include a female lock portion 410 (i.e., loop) on a first end 92 of the waist strap 56 and a male lock portion 460 (i.e., hook) on a second end 94 of the waist strap 56, with the ends 94, 92 of the waist strap 56 for attaching one another 410, 460 together. In some embodiments, the female lock portion 410 can comprise a first fastening loop 412, a second fastening loop 432, and connection member 452 for aligning the first fastening loop 412 and the second fastening loop 432 together, wherein each fastening loop 412, 432 includes an opening 426, 446 for receiving the male lock portion 460.

As shown in FIGS. 1A-1B and 4A-4B, the fastener 24 can comprise at least two interlocking parts 410, 460, with each part attached to the waist strap 56. Each interlocking part can be secured to the waist strap 56 by a connection strap 84 connected or joined to the waist strap 56, for example at the ends 55, 56 of the waist strap 56.

As shown in FIGS. 4A-4B, the interlocking parts of the fastener 24 can comprise a female lock portion 410 and a male lock portion 460.

The female lock portion 410 can include first and second fastening loops 412, 432 fastened together with a connection member 452.

The first fastening loop can include a top member 414 and a bottom member 418 opposite each other, with a pair of side members 422, 424 opposite each other, located between and joining the top and bottom members 414, 418 to each other. The length of the top member 414 can be the same as the length of the bottom member 418, and it preferred that the length of the side members 422, 424 be greater than the width of a standard lap seat belt strap. It is preferred that the distance between the top and bottom members 414, 418 can be greater than the width of a lap seat belt 1009 and shorter than the width of the waist strap 56.

The side members 422, 424, can include an aligning side member 422 and a non-aligning side member 424. The length of the aligning side member 422 can be the same as the length of the non-aligning side member 424. The length of the side members 422, 424 can be different than the length of the top and bottom members 414, 418.

The top member 414, bottom member 418, aligning side member 422, and non-aligning side member 424 can define an opening 426 in the first fastening loop 412.

The first fastening loop 412 can include a top indented portion 415 on the top member 414 and a bottom indented portion 419 on the bottom member 418. It is preferred that the top and bottom indented portions 415, 419 be located opposite each other on their respective top and bottom members 414, 418. The top and bottom indented portions 415, 419 can be located at equal distances from either the aligning side member 422 or the non-aligning side member 426 (or both).

The second fastening loop 432 can be similar, but not identical to, the first fastening loop 412.

The second fastening loop 432 can include a top member 434 and a bottom member 438 opposite each other, and a pair of side members 442, 444 opposite each other. A first end of each side member 442, 444 can join a first end of the top and bottom members 434, 438, while a second end of each side member 442, 444 can join a second end of the top and bottom members 434, 438. The length of the top member 434 can be the same as the length of the bottom member 438, and it preferred that the length of the side members 442, 444 be greater than the width of a standard lap seat belt strap. It is preferred that the distance between the top and bottom members 434, 438 can be greater than the width of a lap seat belt 1009 and shorter than the width of the waist strap.

The side members 442, 444 can include an aligning side member 441 and a non-aligning side member 444. The length of the aligning side member can be the same as the length of the non-aligning side member. The length of the side members 442, 444 can be different than the length of the top and bottom members 434, 438.

The second fastening loop 432 can include a top indented portion 435 on the top member 434 and a bottom indented portion 439 on the bottom member 438. It is preferred that the top and bottom indented portions 435, 439 be located opposite each other on their opposing sides. The top and bottom indented portions 435, 439 can be located at equal distances from either the aligning side member 442 or the non-aligning side member 444 (or both).

The top member 434, bottom member 438, aligning side member 442, and non-aligning side member 444 can define an opening 446 in the second fastening loop 432.

The fastening loops 412, 432 can take the general shape of squares or rectangles, with the top and bottom members at approximate right angles to the side members, and the members of each fastening loop can define an opening in each fastening loop.

The first and second fastening loops 412, 432 can differ in the lengths of their top members 414, 434 and bottom members 418, 438. It is preferred that the lengths of the aligning side members 422, 442 and non-aligning side members 424, 444 of the first and second fastening loops 412, 432 be of similar or same length, but that the top and bottom members 414, 418 of the first fastening loop 412 be longer than the top and bottom members 434, 438 of the second fastening loop 432.

It is preferred that the when the first and second fastening loops 412, 432 are positioned against each other so that their top indented portions 415, 435 and their bottom indented portions 419, 439 align, their aligning side members 422, 442 are positioned to contact each other along their lengths. That is, the aligning side members 422, 442 can be in continuous or contiguous contact or alignment with each other.

It is preferred that the when the first and second fastening loops 412, 432 are positioned against each other so that their top indented portions 415, 435 and their bottom indented portions 419, 439 align, their non-aligning side members 424, 444 do not contact each other along their lengths. A portion of the openings 426, 446 of fastening loops 412, 432 can also align with each other when the indented portions 415, 419, 435, 439 of the fastening loops 412, 432 are aligned. The top and bottom members 434, 438 of the second fastening loop 432 can be in contact or alignment with a portion of the top and bottom members 414, 418 of the first fastening loop 412. The non-aligning side members 424, 444 can run parallel to each other, without contacting each other.

When the when the first and second fastening loops 412, 432 are positioned against each other so that their top indented portions 415, 435 and their bottom indented portions 419, 439 align, the fastening loops 412, 432 can be secured with a connection member 452, such as a clip. A first end 454 of the connection member 452 can engage the top indented portions 415, 435 together to maintain their aligned position; a second end 456 of the connection member 452 can simultaneously engage the bottom indented portions 419, 439 to maintain their aligned position. The first and second ends 454, 456 of the connection member 452 can be connected (or joined) by a shank member 458, the shank member 458 being between the first and second ends 454, 456. The connection members 452 can comprise wires wrapped around or encircling the aligned top indented portions 415, 435 and aligned bottom indented portions 419, 439.

It is preferred that the connection member 452 secure the top indented portions 415, 435 and bottom indented potions 419, 439 loosely enough to allow movement of the fastening loops 412, 432. The shank member 458 can bisect the opening of one, but preferably not both, fastening loops 412, 432. As shown in FIGS. 4A-4B, the shank member 458 can bisect the opening 446 of the second fastening loop 432.

The female lock portion 410 can be secured to the waist strap 56 by a connection strap 84 by threading the connection strap 84 through the first fastening loop opening 426 between the connection member 452 and the non-aligning side member 422 of the first fastening loop 412; then through the opening 446 of the second fastening loop 432 between the connection member 452 and the non-aligning side member 444 of the second fastening loop 432; then threading through the opening 426 of the first fastening loop opening 426 between the non-aligning side member 426 and the connection strap 84.

The male lock portion 460 can include a "J"-shaped profile 461, having an elongated portion 464 joined to a hooking or curved portion 468, the curved portion 468 having an end portion 472 opposite its connection to the elongated portion 464. The elongated portion 464 can include a means for attaching to the waist strap 56. For example, the elongated portion 464 can include an opening 466 through which a connection strap 84 can be threaded, the connection strap 84 joining the male lock portion 460 to the waist strap 56. It is preferred that such an opening b466 e wide enough to accommodate the threading of a connection strap 84 through it.

With the elongated portion 464 secured or attached or fastened to the waist strap 56, the curved portion 468 can be positioned to engage the female lock portion 410. The curved portion 468 can travel through the openings 426, 446 of the fastening loops 412, 432. The inner surface 474 of the curved portion 468 can engage the female lock portion 410 by contacting or hooking the aligning side members 422, 442 of the fastening loops 412, 432, providing a male-female connection between the male and female lock portions 460, 410. When the male and female locking portions 460, 410 are engaged, the curved portion 468 of the male lock portion 460 can be located between the connection member 452 and the non-aligning side members 424,444 of the female lock portion 410. The distance between the connection member 452 and the aligned aligning side members 422, 444 can be shorter than the length of the end portion 472 of the male lock portion 460, to discourage the male lock portion 460 from disengaging with the female lock portion 410.

It will be seen that the attached combination of waist strap 56 and waist strap padding 44 are of sufficient lengths to exceed the circumference of the wearer's waist. It will be understood by persons having skill in the art that means to expand and contract the length of each of the waist strap 56 and waist strap padding 44 can be provided, in a manner well known in the art, such that the series of straps 22 is completely adjustable to the girth of a typical user or wearer 1001.

Using the Restraint System

There is no single standard seat belt system in all motor vehicles. The seat belt system of some older motor vehicles consisted of only a lap seat belt 1009. Many commercial vehicles, such as airplanes and buses, use a similar system. Some vehicles rely on a lap belt that is used in conjunction with a tether line 1011 attaching the restraint system 10 to an anchoring structure for securing a restraint harness. Many modern motor vehicles have seat belt systems having a lap seat belt 1009 and shoulder seat belt 1007.

The restraint system 10 provides multiple security features for securing it to a variety of different seats and seat belt systems. Three preferred concepts of using the restraint system 10 of the present invention are described. In preferred embodiments, the same restraint system 10 can be used for all three methods described.

In a first embodiment for using the invention shown in FIGS. 5-6, the restraint system 10 can be secured to a seat belt system having both a lap seat belt 1009 and a shoulder seat belt 1007. After an individual 1001 dons the restraint system 10 and is seated in the vehicle, the lap seat belt 1009 can be secured to the lap cover 74 and the shoulder seat belt 1007 can be secured to the shoulder seat belt security member 38.

To secure the lap seat belt 1009, it can be extended and threaded through each lap seat belt guide member 83 of each lap strap 76, 78. The lap seat belt 1009 can be manipulated or threaded through the opening of the lap seat belt guide member 83 to align along the channel of the lap seat belt guide member 83, and the lap seat belt 1009 can be locked in place in the vehicle's seat belt system. It is preferred that the lap seat belt 1009 be threaded through all of the lap seat belt guide members 83 of the restraint system 10.

To secure the shoulder seat belt 1007, it can be extended across the torso of the individual 1001. When the shoulder seat belt 1007 is engaged, the shoulder seat belt security member 38, which can slidingly move along the front portion 28 of the shoulder strap 26, can be positioned to engage the shoulder seat belt 1007 where it crosses the front portion 28 of the shoulder strap 26. The front cover 46 can be moved to the open configuration to expose the positioning strap 40 and shoulder seat belt guide member 47. The position of the shoulder seat belt guide member 47 can be adjusted along the positioning strap 40 so that the shoulder seat belt 1007 can engage the shoulder seat belt guide member 47.

The shoulder seat belt 1007 can be manipulated or guided through the opening of the shoulder seat belt guide member 47 to align along the channel 99 of the shoulder seat belt guide member 47, and the shoulder seat belt 1007 can be positioned along the positioning strap 40. The front cover can be moved to the closed configuration, thus securing the shoulder seat belt 1007 within the shoulder seat belt security member 38.

The seat belts can be secured in either order or can be secured simultaneously.

In a second embodiment for using the invention shown in FIG. 5, the restraint system 10 can be secured to a seat belt system having both a lap seat belt 1009 and a tether line 1011. A tether line 1011 can be secured to an anchoring structure within the seat 1003 or can be tied or otherwise secured to the legs of the seat.

Here, the lap seat belt 1009 can be secured to the restraint system 10 as described previously.

The tether line 1011 can be attached to the restraint system 10 by fastening to the tether security member 86 and/or stringing through the tether channel 96 on the rear portion 30 of the shoulder strap 26. The tether line 1011 can include any type of attachment device, including rings, carabineers, D-ring connectors, or other loop type fasteners, without departing from the novel scope of the present invention. The tether line 1011 can be threaded through the tether channel 96 and secured to the seat 1003.

The lap seat belt 1009 and tether line 1011 can be secured in either order or can be secured simultaneously.

In a third embodiment for using the invention shown in FIG. 7, the restraint system 10 can be secured to a seat belt system having a lap seat belt 1009, either by itself or with other seat belts.

Here, the lap belt can be secured to the restraint system 10 as described previously.

The securing action of the lap seat belt 1009 can be augmented by using a band 1021 or supplemental strap to secure the back security member 34 of the restraint system 10 to the seat 1003 of the vehicle. The band 1021 can be threaded through the passageway 36 of the back security member 34 and when the individual 1001 is sitting in the seat 1003, the band 1021 can be fastened behind (or around or to) the individual's seat. It is envisioned that the fastened band 1021 will be fastened tight enough to safely secure the individual 1001 to the seat 1003. Because the band 1021 can slide through the passageway 36, the individual 1001 can be provided some freedom of movement.

The lap seat belt 1009 and the band 1021 can be secured in either order or can be secured simultaneously.

The supplemental band 1021 can be used to augment a seat belt system having lap seat belt 1009s used in conjunction with other seat belts or security features.

When attached in these manners, the restraint system 10 can be engaged to the automobile's or other motor vehicle's safety system, providing security for the user 1001 as well as allowing the wearer a degree of movement and comfort, further increasing wearer compliance with the use and adjustment of this restraint system 10.

The restraint system 10, as illustrated, further includes means, as described above with respect to other embodiments of the invention, to connect the restraint system 10 to the seat belt system of different types of automobile or other vehicles. As shown in FIG. 6, for example, the present invention can be used to connect an individual 1001 to a seat 1003 of the kind typically found in an automobile, airplane, school bus, or other private or commercial vehicle via the restraint system 10.

The present invention can relate to a restraint system for use in commercial vehicles other than automobiles, such as trains, buses, roller coasters, and airplanes and other airborne vehicles; in particular, vehicles associated with mass transportation, as shown in FIGS. 5-7. The adjustability features of the present invention support embodiments of the present invention that can be adapted for use with vehicles having commercial uses instead or automobiles, as well embodiments that can be adapted for use with both types of vehicles.

As will be understood by persons having skill in the art, the straps 22 can be attachable to each other in manners well known in the art, such as by stitching, rivets, adhesives, combinations of these or other manners know to persons having skill in the art. The straps 22 can be joined directly to each other or can be joined indirectly by connection straps 84.

The straps 22 of the restraint system 10 can be made of the same types of straps used to make seat belts in motor vehicles, but it will be understood by persons having skill in the art that other materials can be used.

In some embodiments, the straps 22 can further comprise additional fasteners, buckles, or loops to attachment of supplemental safety devices.

It will be seen that the design of restraint system 10 is such that it has an appealing appearance such that the user 1001, typically a child, will enjoy wearing the restraint system 10. In this manner the child is encouraged to wear the restraint system 10 protecting the wearer.

It will be understood, by persons having skill in the art, that while reference has been made to children or a child as the wearer or user 1001 of the illustrated and described embodiments of the present invention, the manufacture and use of appropriately sized embodiments for adults and persons of any age, as well as the use of the system(s) of the present invention with animals, is contemplated and does not present a departure from the novel scope of the present invention.

The restraint system 10 can comprise a neck rest or other structure to protect the wearer's head and neck in conjunction with the restraint system 10. In this manner, the restraint system 10 can be engaged with supplemental safety systems or devices to provide additional protection to the wearer.

Although illustrative embodiments of the invention have been shown and described, it is to be understood that various modifications and substitutions can be made by those skilled in the art without departing from the novel spirit and scope of the invention.

What is claimed is:

1. A restraint system for use in a vehicle with a seat belt system comprising:
    a plurality of straps for attaching to the seat belt system of the vehicle, including: first and second shoulder straps joined to each other in a rear portion of the restraint system, each shoulder strap having a shoulder seat belt security member for attaching a shoulder seat belt of the vehicle to the shoulder strap, each shoulder seat belt security member being slidable along the shoulder strap;
    a shoulder seat belt guide member having a variable position on the shoulder strap for adjusting the shoulder seat belt security member to align with the shoulder seat belt;
    a waist strap joined to the first and second shoulder straps, the waist strap having first and second ends for attaching to each other, the attached ends securing the waist strap to a torso of an individual; and
    a lap cover comprising first and second lap straps connected to the first and second shoulder straps, respectively, each lap strap removably attachable to the other lap strap and each lap strap comprising a lap seat belt guide member having an opening, each lap seat belt guide member defining a channel for receiving a lap seat belt of the vehicle;
    wherein the straps are wearable by an individual such that when the individual is seated inside the vehicle and the restraint system can engage at least one seat belt of the vehicle, the individual can be secured to a seat of the vehicle and the individual remains secured against the seat of the vehicle notwithstanding the motion of the vehicle.

2. The restraint system of claim 1, comprising a fastener for securing the waist strap to the individual, the fastener comprising a female lock portion attached to the first end of the waist strap, the female lock portion comprising a first fastening loop, a second fastening loop, and a clip for aligning the first fastening loop and the second fastening loop, wherein the aligned fastening loops define an opening for receiving a male lock portion.

3. The restraint system of claim 1, comprising a back security member, the back security member joining the shoulder straps and comprising a passageway for receiving a band for securing the back security member to the seat.

4. The restraint system of claim 1, each shoulder seat belt security member comprising:
    a front cover connected to a back cover;
    a positioning strap extending diagonally between opposite corners of the back cover; and
    a shoulder seat belt guide member having an opening and defining a channel for receiving a shoulder seat belt of the vehicle, the shoulder seat belt guide member slidingly engaging the positioning strap;
    wherein the front cover can open for engaging the shoulder seat belt with the channel of the shoulder seat belt guide member, the front cover can close to secure the shoulder seat belt within the shoulder seat belt security member, and the shoulder strap is positioned between the back cover and the positioning strap.

5. The restraint system of claim 1, wherein each shoulder strap comprises a tether security member for attaching a tether line to the shoulder strap.

6. The restraint system of claim 5, wherein the shoulder strap comprises a passageway for threading the tether line through the shoulder strap.

7. The restraint system of claim 1, wherein the first and second ends of the waist strap are connected to the first and second shoulder straps, respectively.

8. A restraint system for use in a vehicle with a seat belt system comprising:
    first and second shoulder straps, each shoulder strap having: a) a front portion, b) a back portion, and c) a shoulder seat belt security member attached for sliding movement along the front portion of the shoulder strap;
a shoulder seat belt guide member having a variable position on a shoulder strap for aligning a shoulder seat belt of the vehicle within a channel of the shoulder seat belt security member
a back security member attaching the back portions of the shoulder straps to each other;
a waist strap joined to the front and back portions of the shoulder straps, the waist strap including a first front section for attaching to a second front section, the front sections for securing the waist strap to a torso of an individual; and
a plurality of lap straps attached to a front portion of the waist strap by a plurality of connection straps joining the lap straps to the waist strap, each lap strap comprising a lap seat belt guide member having:
i) an opening for inserting a lap seat belt of the vehicle and
ii) a channel for receiving the lap seat belt, and neighboring lap straps overlapping and fastening to each other;
wherein the straps are wearable by an individual such that when the individual is seated in the vehicle, the restraint system can secure at least one seat belt of the vehicle and secure the individual against a seat of the vehicle notwithstanding the motion of the vehicle.

9. The restraint system of claim 8, each shoulder seat belt security member comprising:
front and back covers;
a positioning strap extending diagonally between and attaching to opposite corners of the back cover, the shoulder strap positioned between the positioning strap and the back cover; and
a shoulder seat belt guide member having an opening and defining a channel for receiving a shoulder seat belt of the vehicle, the shoulder seat belt guide member slidingly engaging the positioning strap;
wherein the front cover can open for engaging the shoulder seat belt with the shoulder seat belt guide member, and the front cover can close to secure the shoulder seat belt within the shoulder seat belt security member; and
wherein the restraint system is wearable by an individual such that when the individual is seated in the vehicle, the restraint system can secure the lap seat belt and a shoulder seat belt of the vehicle and secure the individual against the seat of the vehicle notwithstanding the motion of the vehicle.

10. The restraint system of claim 8, the back security member comprising a
passageway for receiving a band for securing the back security member to a back portion of the seat;
wherein the restraint system is wearable by an individual such that when the individual is seated in the vehicle, the restraint system can secure the lap seat belt of the vehicle, secure the band to the seat, and secure the individual against the seat of the vehicle notwithstanding the motion of the vehicle.

11. The restraint system of claim 10, the back security member joining the shoulder straps along a first line defined by the points where the outer edges of the shoulder straps cross each other, and the back security member joining the shoulder straps along a second line defined by the points where the inner edges of the shoulder straps cross each other.

12. The restraint system of claim 8, each shoulder strap comprising a tether security member for attaching a tether line to the shoulder strap;
wherein the restraint system is wearable by an individual such that when the individual is seated in the vehicle, the restraint system can secure the lap seat belt of the vehicle, secure the tether line to the seat, and secure the individual against the seat of the vehicle notwithstanding the motion of the vehicle.

13. The restraint system of claim 8, the back security member joining the shoulder straps that cross over each other.

14. A restraint system for use with a seat having a seat belt system comprising:
first and second shoulder straps, each shoulder strap having a front portion, a back portion, and a shoulder seat belt security member attached for sliding movement of the shoulder seat belt security member along the front portion of the shoulder strap, the back portions comprising a passageway for threading a tether line through the shoulder straps of the shoulder straps crossing over each other, the shoulder seat belt security member for securing a shoulder seat belt to the restraint system;
a back security member attaching the back portions of the shoulder straps to each other, the back security member comprising a passageway, the back security member for securing a supplemental belt to the restraint system;
each shoulder strap having a tether security member located between the front and back portions, the tether security member for securing a tether line to the restraint system;
a waist strap joined to the front and back portions of the shoulder straps, a first front section of the waist strap for attaching to a second front section of the waist strap, the waist strap for securing the restraint system to an individual; and
a lap cover comprising first and second lap straps connected to the first and second front sections of the waist strap, respectively, each lap strap removably attachable to the other lap strap and each lap strap comprising a lap seat belt guide member having an opening, each lap seat belt guide member defining a channel for receiving a lap seat belt, the lap cover for securing a lap seat belt to the restraint system;
wherein the straps are wearable by the individual such that when the individual is seated in the seat, the restraint system can secure at least one seat belt of the seat and secure the individual against the seat.

15. The restraint system of claim 14, comprising a fastener for securing the waist strap to the individual, the fastener comprising a female lock portion attached to a first end of the waist strap, the female lock portion comprising a first fastening loop, a second fastening loop, and a clip for aligning the first fastening loop and the second fastening loop, wherein the aligned fastening loops define an opening for receiving a male lock portion.

16. The restraint system of claim 14, each shoulder seat belt security member comprising:
a front cover and a back cover connected to each other;
a positioning strap extending diagonally between and attaching to opposite corners of the back cover, the shoulder strap positioned between the positioning strap and the back cover; and
a shoulder seat belt guide member having an opening and defining a channel for receiving a shoulder seat belt of the vehicle, the shoulder seat belt guide member slidingly engaging the positioning strap;

wherein the front cover can open to expose the positioning strap and the shoulder seat belt guide member, the front cover can close to conceal the positioning strap and the shoulder seat belt guide member, and the shoulder strap is threaded between the back cover and the positioning strap.

17. The restraint system of claim 14, the shoulder seat belt guide member having a variable position for adjusting the shoulder seat belt security member to align with the shoulder seat belt.

\* \* \* \* \*